United States Patent
Gonzales

(10) Patent No.: US 6,568,121 B1
(45) Date of Patent: May 27, 2003

(54) FISH BITE INDICATING APPARATUS

(76) Inventor: Daniel L. Gonzales, 2790 Cottonwood Dr., Denver, CO (US) 80221

( * ) Notice: Subject to any disclaimer, the term of this patent is extended or adjusted under 35 U.S.C. 154(b) by 0 days.

(21) Appl. No.: 09/899,978

(22) Filed: Jul. 6, 2001

Related U.S. Application Data

(63) Continuation-in-part of application No. 09/540,508, filed on Mar. 31, 2000, now Pat. No. 6,374,533.

(51) Int. Cl.$^7$ .............................................. A01K 97/12
(52) U.S. Cl. ......................................................... 43/17
(58) Field of Search ............................................... 43/17

(56) References Cited

U.S. PATENT DOCUMENTS

| | | | | |
|---|---|---|---|---|
| 4,006,550 A | * | 2/1977 | Rizzo | 43/17 |
| 4,020,578 A | * | 5/1977 | Hope | 43/17 |
| 4,266,217 A | * | 5/1981 | Kao | 43/17 |
| 4,399,631 A | | 8/1983 | Smith | |
| 4,519,158 A | * | 5/1985 | Kirk | 43/17 |
| 4,520,586 A | * | 6/1985 | Moisan | 43/17 |
| 4,586,284 A | | 5/1986 | Westwood, III | |
| 5,182,873 A | | 2/1993 | Aragon, Jr. | |
| 5,228,228 A | | 7/1993 | Meissner | |
| 5,261,180 A | * | 11/1993 | Foster | 43/17 |
| D346,007 S | | 4/1994 | Barkley, Jr. | |
| 5,396,726 A | | 3/1995 | Zepeda, Sr. | |
| 5,771,624 A | * | 6/1998 | Vickery | 43/17 |
| 5,867,931 A | * | 2/1999 | Morris | 43/17 |
| 5,996,268 A | * | 12/1999 | Buczkowski | 43/17 |
| 6,374,533 B1 | * | 4/2002 | Gonzales | 43/17 |

* cited by examiner

Primary Examiner—Kurt Rowan

(57) ABSTRACT

A fish bite indicating apparatus for alerting a user of a fish bite. The fish bite indicating apparatus includes a housing having an exterior with a top side, a bottom side, a first end, and a second end. An indicator is provided for indicating movement of a fishing line in a manner corresponding to biting on a lure on an end of the fishing line. The indicator emits a signal when actuated. A mounting structure is provided for mounting the housing on the fishing pole. An actuating mechanism is provided for actuating the indicator upon detection of movement of the fishing line in a manner corresponding to biting on a lure on an end of the fishing line.

11 Claims, 3 Drawing Sheets

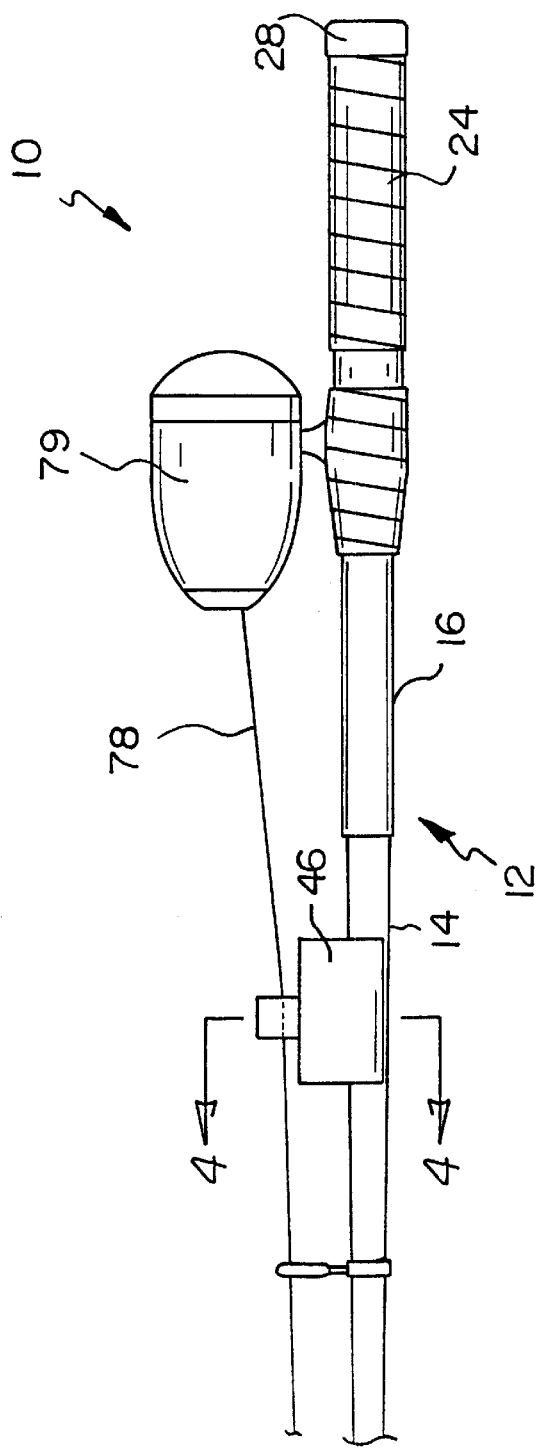
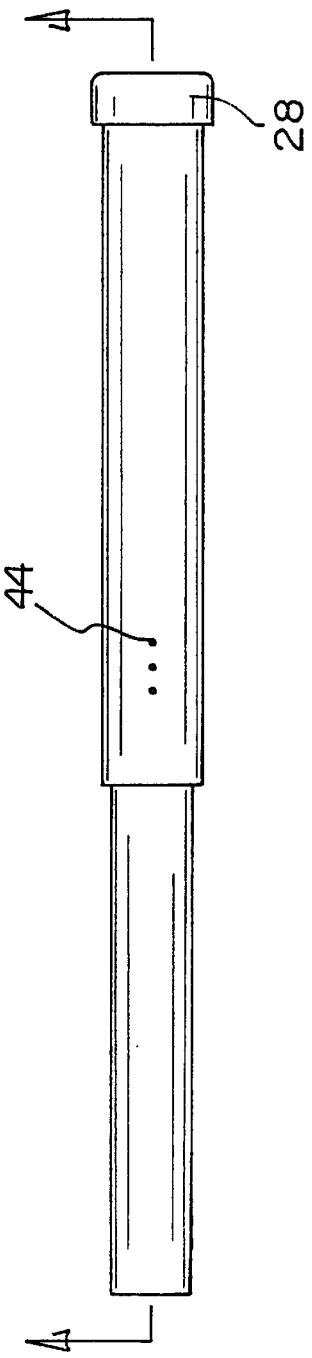

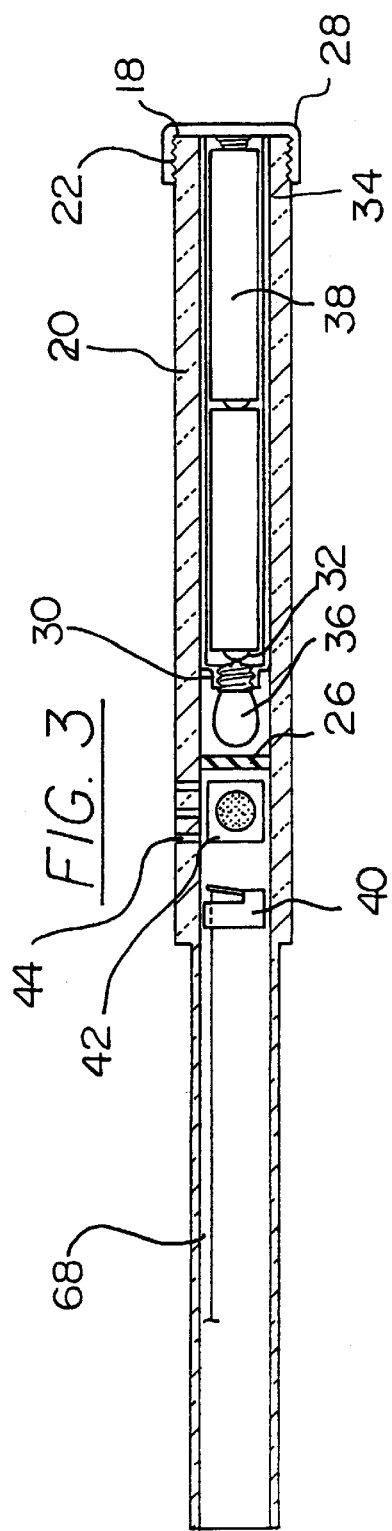
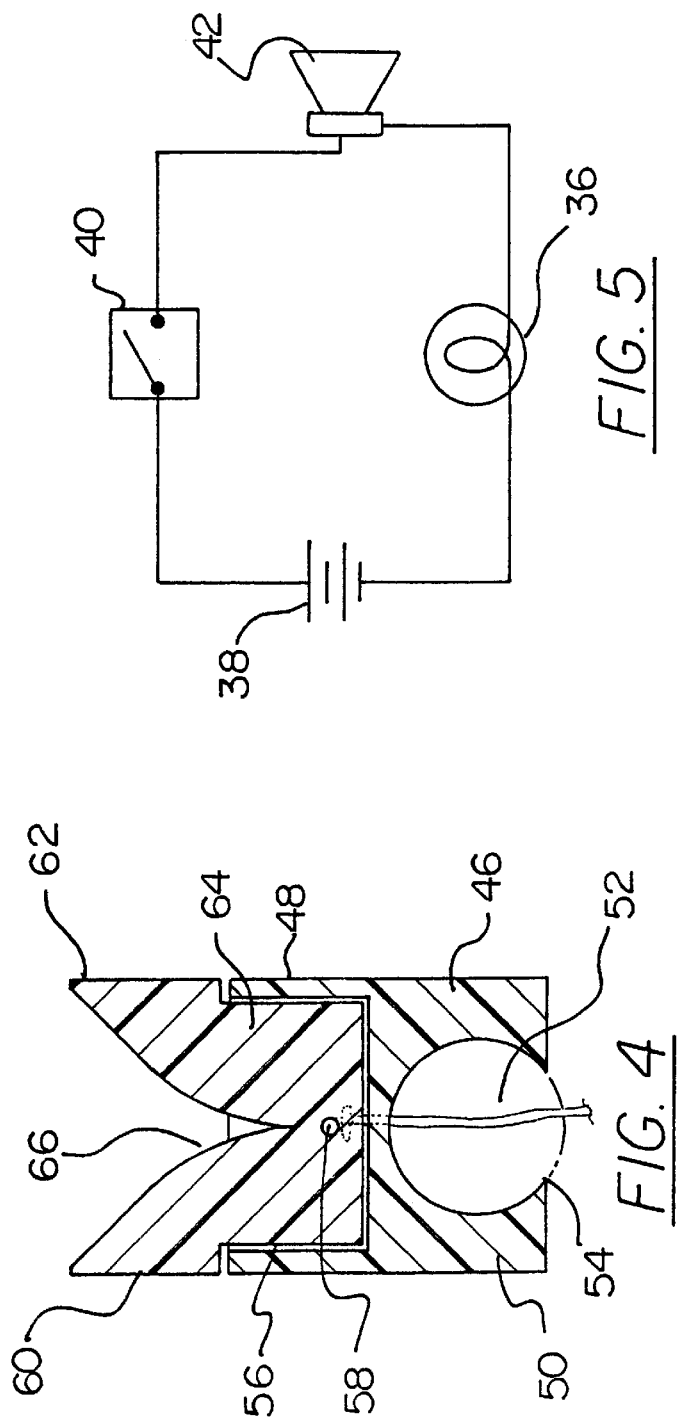

FISH BITE INDICATING APPARATUS

REFERENCE TO RELATED APPLICATION

This application is a continuation-in-part of application Ser. No. 09/540,508, filed Mar. 31, 2000 now U.S. Pat. No. 6,374,533.

BACKGROUND OF THE INVENTION

1. Field of the Invention

The present invention relates to fish bite indicators and more particularly pertains to a new fish bite indicating apparatus for alerting a user of a fish bite.

2. Description of the Prior Art

The use of fish bite indicators is known in the prior art. More specifically, fish bite indicators heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. Nos. 5,228,228; 5,396,726; 4,586,284; 4,399,631; 5,182,873; and 346,007.

While these devices fulfill their respective, particular objectives and requirements, the aforementioned patents do not disclose a new fish bite indicating apparatus. The inventive device includes a housing having an exterior with a top side, a bottom side, a first end, and a second end. An indicating means is provided for indicating movement of a fishing line in a manner corresponding to biting on a lure on an end of the fishing line. The indicating means emits a signal when actuated. Mounting means is provided for mounting the housing on the fishing pole. Actuating means is provided for actuating the indicating means upon detection of movement of the fishing line in a manner corresponding to biting on a lure on an end of the fishing line.

In these respects, the fish bite indicating apparatus according to the present invention substantially departs from the conventional concepts and designs of the prior art, and in so doing provides an apparatus primarily developed for the purpose of alerting a user of a fish bite.

SUMMARY OF THE INVENTION

In view of the foregoing disadvantages inherent in the known types of fish bite indicators now present in the prior art, the present invention provides a new fish bite indicating apparatus construction wherein the same can be utilized for alerting a user of a fish bite.

The general purpose of the present invention, which will be described subsequently in greater detail, is to provide a new fish bite indicating apparatus apparatus and method which has many of the advantages of the fish bite indicators mentioned heretofore and many novel features that result in a new fish bite indicating apparatus which is not anticipated, rendered obvious, suggested, or even implied by any of the prior art fish bite indicators, either alone or in any combination thereof.

To attain this, the present invention generally comprises a housing having an exterior with a top side, a bottom side, a first end, and a second end. An indicating means is provided for indicating movement of a fishing line in a manner corresponding to biting on a lure on an end of the fishing line. The indicating means emits a signal when actuated. Mounting means is provided for mounting the housing on the fishing pole. Actuating means is provided for actuating the indicating means upon detection of movement of the fishing line in a manner corresponding to biting on a lure on an end of the fishing line.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new fish bite indicating apparatus apparatus and method which has many of the advantages of the fish bite indicators mentioned heretofore and many novel features that result in a new fish bite indicating apparatus which is not anticipated, rendered obvious, suggested, or even implied by any of the prior art fish bite indicators, either alone or in any combination thereof.

It is another object of the present invention to provide a new fish bite indicating apparatus which may be easily and efficiently manufactured and marketed.

It is a further object of the present invention to provide a new fish bite indicating apparatus which is of a durable and reliable construction.

An even further object of the present invention is to provide a new fish bite indicating apparatus which is susceptible of a low cost of manufacture with regard to both materials and labor, and which accordingly is then susceptible of low prices of sale to the consuming public, thereby making such fish bite indicating apparatus economically available to the buying public.

Still yet another object of the present invention is to provide a new fish bite indicating apparatus which provides in the apparatuses and methods of the prior art some of the advantages thereof, while simultaneously overcoming some of the disadvantages normally associated therewith.

Still another object of the present invention is to provide a new fish bite indicating apparatus for alerting a user of a fish bite.

Yet another object of the present invention is to provide a new fish bite indicating apparatus which includes a housing having an exterior with a top side, a bottom side, a first end, and a second end. An indicating means is provided for indicating movement of a fishing line in a manner corresponding to biting on a lure on an end of the fishing line. The indicating means emits a signal when actuated. Mounting means is provided for mounting the housing on the fishing pole. Actuating means is provided for actuating the indicating means upon detection of movement of the fishing line in a manner corresponding to biting on a lure on an end of the fishing line.

Still yet another object of the present invention is to provide a new fish bite indicating apparatus that has a light which will illuminate a portion of the handle when a fish bite is detected.

Even still another object of the present invention is to provide a new fish bite indicating apparatus that has a speaker to alert a user of a fish bite.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a schematic side view of a new fish bite indicating apparatus according to the present invention.

FIG. 2 is a schematic side view of the present invention.

FIG. 3 is a schematic cross-sectional view taken along line 3—3 of the present invention.

FIG. 4 is a schematic cross-sectional view taken along line 4—4 of the present invention.

FIG. 5 is an electronic schematic of the present invention.

DESCRIPTION OF THE PREFERRED EMBODIMENT

Figures 6, 7:
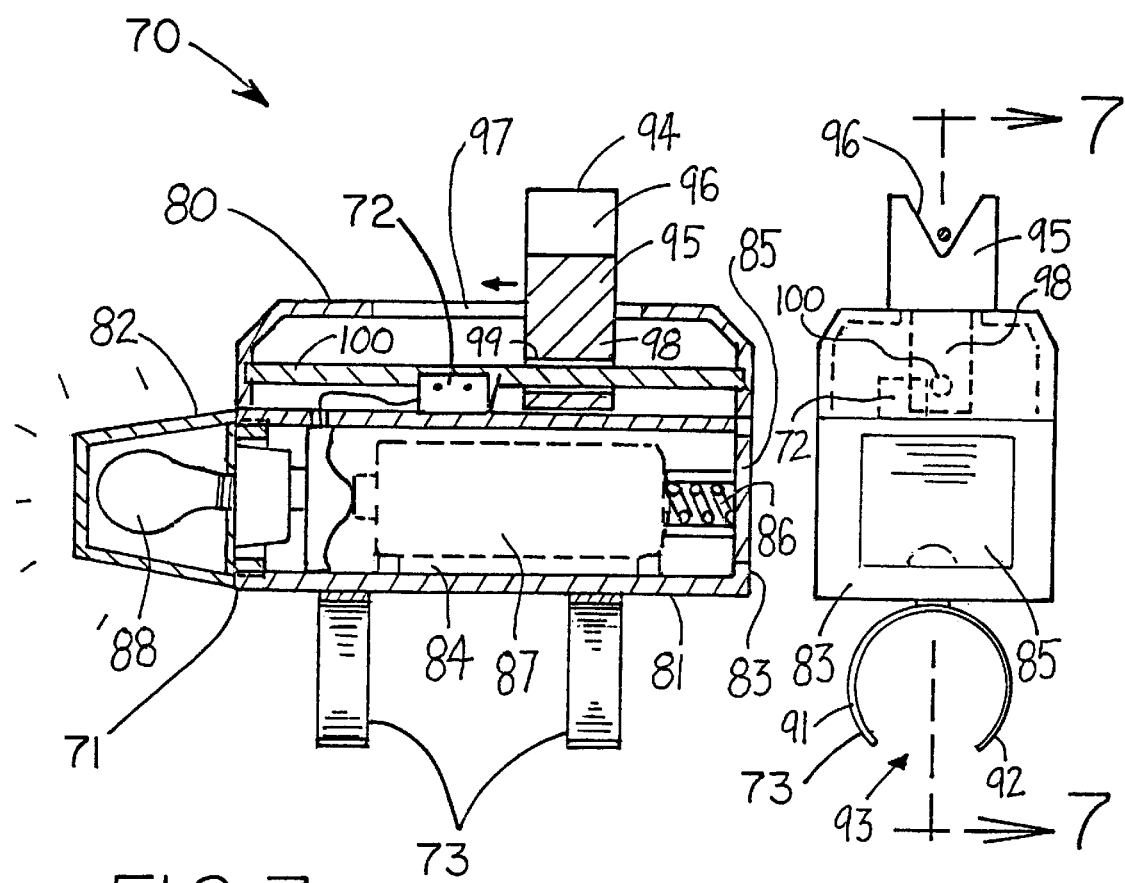
FIG. 6 is a schematic end view of an optional embodiment of the present invention adapted for mounting on a fishing rod.
FIG. 7 is a schmatic sectional view of the optional embodiment shown in FIG. 6 taken along line 7—7 of FIG. 6.

With reference now to the drawings, and in particular to FIGS. 1 through 7 thereof, a new fish bite indicating apparatus embodying the principles and concepts of the present invention and generally designated by the reference numeral 10 will be described.

As best illustrated in FIGS. 1 through 5, the fish bite indicating apparatus 10 generally comprises a fishing rod 12. The fishing rod 12 has a pole portion 14 and a handle portion 16. The fishing rod 12 is substantially hollow. The handle portion 16 has an open end 18. Ideally the handle portion 16 is translucent and is made from a plastic or fiberglass. The handle portion 16 has an exterior surface 20. The exterior surface 20 of the handle portion 16 has threads therein 22, which are located generally adjacent to the open end 18 of the handle portion 16. The handle portion may be wrapped with tape 24 or covered with any material known in the art to provide gripping of the handle portion. Any covering should allow a portion of exposed handle.

An interior wall 26 is within of the handle portion 16. The interior wall 26 is located between the open end 18 and pole portion 14.

A covering member 28 removably covers the open end 18 of the handle portion 16. The covering member 28 is a cap having threads therein for removably coupling to the threads 22 on the handle portion 16.

A capsule 30 has dimensions adapted to fit in the handle portion 16 between the interior wall 26 and the open end 18. The capsule 30 has a first end 32 and a second end 34. The first end 32 has a light bulb 36 therein. The second end 34 is open, and the capsule 30 has a power source 38 therein for powering the light bulb 36. The power source 38 is preferably two batteries. The power source is operationally coupled to the light bulb 36.

An actuating means 40 turns on the light bulb 36. The actuating means 40 is mounted in the handle portion 16, and is located between the interior wall 26 and the pole portion 14. The actuating means 40 is operationally coupled to the power source 38.

A speaker 42 for producing a sound is located between the interior wall 26 and the actuating means 40. The speaker 42 is operationally coupled to the power source 38 and the actuating means 40.

A plurality of bores 44 in the handle portion 16 is generally adjacent to the speaker 42 for permitting sound produced by the speaker 42 to exit the fishing rod 12. The plurality of bores 44 is ideally three bores.

A saddle 46 has a top portion 48 and a bottom portion 50. The bottom portion 50 has an annular groove 52 therein. The groove 52 has a pair of opposed fingers 54 for gripping the exterior surface of the pole portion 14. The top portion 48 has a cavity 56 therein. The cavity 56 has a pin 58 mounted therein. The pin 58 has a longitudinal axis is orientated generally parallel to an axis of the annular groove 52.

A trigger slides 60 on the pin 58. The trigger 60 has a top section 62 and a bottom section 64. The bottom section 64 has a shape adapted for sliding in the cavity 56. The bottom section 64 has a bore therein for receiving the pin 58. The top section 64 has a slot 66 therein for receiving a portion of the fishing line 78 from the reel 79. The slot 66 has a V-shape.

A tension line 68 connects the actuating means 40 to the trigger 60. The tension line 68 has a first end and a second end. The first end is fixedly coupled to the actuating means 40. The second end is fixedly coupled to the bottom section 64 of the trigger 60.

A second embodiment 70 is depicted in FIGS. 6 and 7. The second embodiment includes a housing 71, which may be mounted to a fishing pole. The housing has an exterior with a top side 80, a bottom side 81, a first end 82, and a second end 83. The housing is generally hollow and may define a power source chamber 84 in the housing. A door 85 may be mounted on the housing for permitting removal and replacement of a power source in the power source chamber. The door may have a biasing spring 86 mounted thereon for biasing a power source into the power source chamber. A power source, such as a (single-use or rechargeable) battery 87, may be removably mounted in the housing for powering the indicating means.

Indicating means may be provided for indicating movement of a fishing line mounted on the fishing pole in a manner that corresponds to biting on a lure on an end of the fishing line. The indicating means preferably emits a signal when actuated.

Preferably, the indicating means comprises a light 88 that is adapted to illuminate when the indicating means is actuated. The light is mounted on the housing, and may be mounted on one of the ends of the housing.

Mounting means may be provided on the housing for mounting the housing on the fishing pole. The mounting means is preferably mounted on an exterior of the housing, and is ideally mounted on a bottom side of the housing. The mounting means may comprise at least one mounting clip 73, and the mounting clip may includes a pair of opposed arms 91, 92 with a gap 93 therebetween for receiving a portion of the fishing rod. Optionally, the mounting means may comprise a pair of the mounting clips 73.

Actuating means may be provided for actuating the indicating means upon detection of movement of the fishing line in a manner corresponding to biting on a lure on an end of the fishing line by a fish. The actuating means may extend from the exterior of the housing for engaging the fishing line mounted on the fishing pole. The actuating means may be mounted on the top side 80 of the housing 71 in a location opposite of the mounting means.

The actuating means may comprise a saddle 94 mounted on the housing in a manner permitting translation movement of the saddle with respect to the housing. The saddle is moveable between a first position and a second position. The saddle may include a top portion 95 that is provided for engaging a portion of the fishing line. The top portion may define a V-shaped groove 96 for receiving the portion of the fishing line. The top portion 95 may extend out of the exterior of the housing through a slot 97 in the housing. A bottom portion 98 of the saddle 94 is integrally connected to the top portion of the saddle. The bottom portion may be positioned in the housing. The bottom portion has a channel 99 that extends therethrough. A rod 100 may be mounted on the housing, and the rod may extend through the channel of the bottom portion of the saddle such that the saddle translates along the rod.

The actuating means may also comprise a trigger 72 that is mounted in the housing. The trigger is positioned in the housing such that the trigger is triggered to actuate the indicating means when the saddle is moved from the first position toward the second position by movement of the fishing line in a manner indicating a bite on a lure mounted on the fishing line. The trigger 72 may comprise a switch (such as, for example, a micro-switch) that is operationally connected to the light 88 of the indicating means and the power source for supplying power to the light from the power source when the trigger is triggered.

In use, fishing line 78 from the fishing reel 79 is placed in the slot 66 in the trigger. The trigger is slid toward the handle portion 16 such that the tension line 68 may be pulled taught when the fishing line is pulled away from the handle portion by the biting fish. The tension line actuates the actuating means 40. The actuating means turns on the light 36 and the speaker 44 to signal a fish bite.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A fish bite indicating apparatus for mounting to a fishing pole having a fishing line being mounted thereon, said apparatus comprising:

a housing having an exterior with a top side, a bottom side, a first end, and a second end;

indicating means for indicating movement of a fishing line in a manner corresponding to biting on a lure on an end of the fishing line, the indicating means emitting a signal when actuated;

mounting means mounted on said housing for mounting said housing on the fishing pole; and actuating means mounted on said housing for actuating said indicating means upon detection of movement of the fishing line in a manner corresponding to biting on a lure on an end of the fishing line;

wherein said actuating means comprises:

a saddle mounted on said housing in a manner permitting translation movement of said saddle with respect to said housing, said saddle being moveable between a first position and a second position; and a trigger mounted in said housing, said trigger being positioned in said housing such that said trigger is triggered to actuate said indicating means when said saddle is moved from said first position toward said second position by movement of the fishing line in a manner indicating a bite on a lure mounted on the fishing line;

wherein said saddle includes:

a top portion for engaging a portion of the fishing line, said top portion defining a V-shaped groove for receiving the portion of the fishing line, said top portion extending out of the exterior of said housing through a slot in said housing; and a bottom portion integrally connected to said top portion, said bottom portion being positioned in said housing, said bottom portion having a channel extending therethrough, a rod being mounted on said housing and extending through the channel of said bottom portion of said saddle such that said saddle translates along said rod.

2. The apparatus of claim 1 additionally comprising a power source mounted in said housing for powering said indicating means.

3. The apparatus of claim 1 wherein said actuating means being mounted on the top side of said housing opposite of said mounting means.

4. The apparatus of claim 1 additionally comprising a power source mounted in said housing, and wherein said trigger comprises a switch operationally connected to said indicating means and said power supply for supplying power to said indicating means from said power supply when said trigger is triggered.

5. The apparatus of claim 1 wherein said housing is generally hollow and defines a power source chamber, a door being mounted on said housing for permitting removal and replacement of a power source in said power source chamber, said door having a biasing spring mounted thereon for biasing a power source into said power source chamber.

6. The apparatus of claim 1 wherein said indicating means comprises a light adapted to illuminate when said indicating means is actuated, said light being mounted on said housing.

7. The apparatus of claim 1 wherein said mounting means is mounted on an exterior of said housing.

8. The apparatus of claim 1 wherein said mounting means is mounted on a bottom side of said housing.

9. The apparatus of claim 1 wherein said mounting means comprises at least one mounting clip including a pair of opposed arms with a gap therebetween for receiving a portion of the fishing rod.

10. The apparatus of claim 9 wherein said mounting means comprises a pair of said mounting clips.

11. A fish bite indicating apparatus for mounting to a fishing pole having a fishing line being mounted thereon, said apparatus comprising:

a housing having an exterior with a top side, a bottom side, a first end, and a second end;

wherein said housing is generally hollow and defines a power a source chamber, a door being mounted on said housing for permitting removal and replacement of a power source in said power source chamber, said door having a biasing spring mounted thereon for biasing a power source into said power source chamber;

indicating means for indicating movement of a fishing line in a manner corresponding to biting on a lure on an end of the fishing line, the indicating means emitting a signal when actuated, said indicating means comprising a light adapted to illuminate when said indicating means is actuated, said light being mounted on said housing, said light being mounted on one of said ends of said housing;

a power source mounted in said housing for powering said indicating means;

mounting means for mounting said housing on the fishing pole, said mounting means being mounted on an exterior of said housing, said mounting means being mounted on a bottom side of said housing;

wherein said mounting means comprises at least one mounting clip including a pair of opposed arms with a gap therebetween for receiving a portion of the fishing rod;

wherein said mounting means comprises a pair of said mounting clips;

actuating means for actuating said indicating means upon detection of movement of the fishing line in a manner corresponding to biting on a lure on an end of the fishing line, said actuating means extending from said exterior of said housing, said actuating means being mounted on the top side of said housing opposite of said mounting means, said actuating means comprising:

a saddle mounted on said housing in a manner permitting translation movement of said saddle with respect to said housing, said saddle being moveable between a first position and a second position, said saddle including:

a top portion for engaging a portion of the fishing line, said top portion defining a V-shaped groove for receiving the portion of the fishing line, said top portion extending out of the exterior of said housing through a slot in said housing;

a bottom portion integrally connected to said top portion, said bottom portion being positioned in said housing, said bottom portion having a channel extending therethrough, a rod being mounted on said housing and extending through the channel of said bottom portion of said saddle such that said saddle translates along said rod;

a trigger mounted in said housing, said trigger being positioned in said housing such that said trigger is triggered to actuate said indicating means when said saddle is moved from said first position toward said second position by movement of the fishing line in a manner indicating a bite on a lure mounted on the fishing line, said trigger comprising a switch operationally connected to said light of said indicating means and a power supply for supplying power to said light from said power supply when said trigger is triggered.

* * * * *